United States Patent Office 3,369,731
Patented Feb. 20, 1968

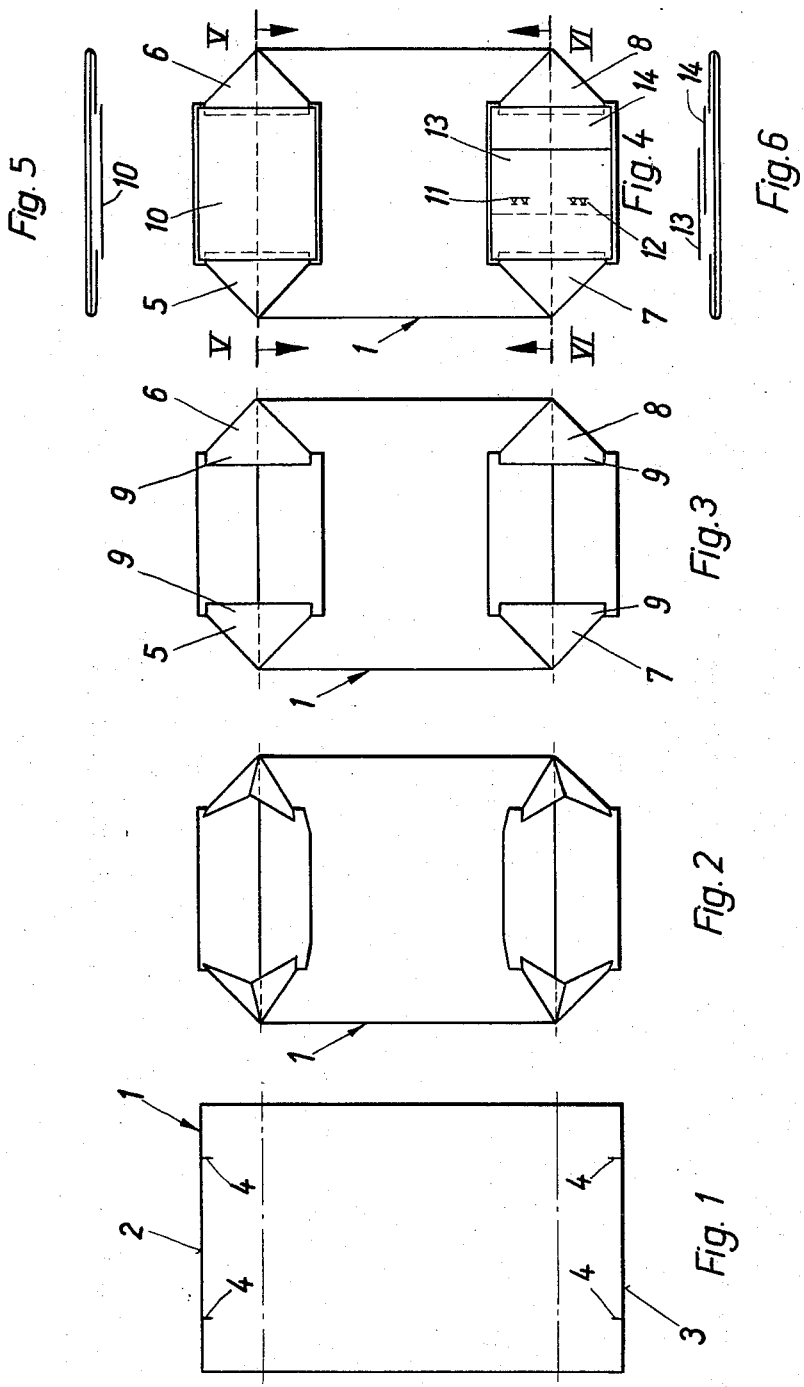

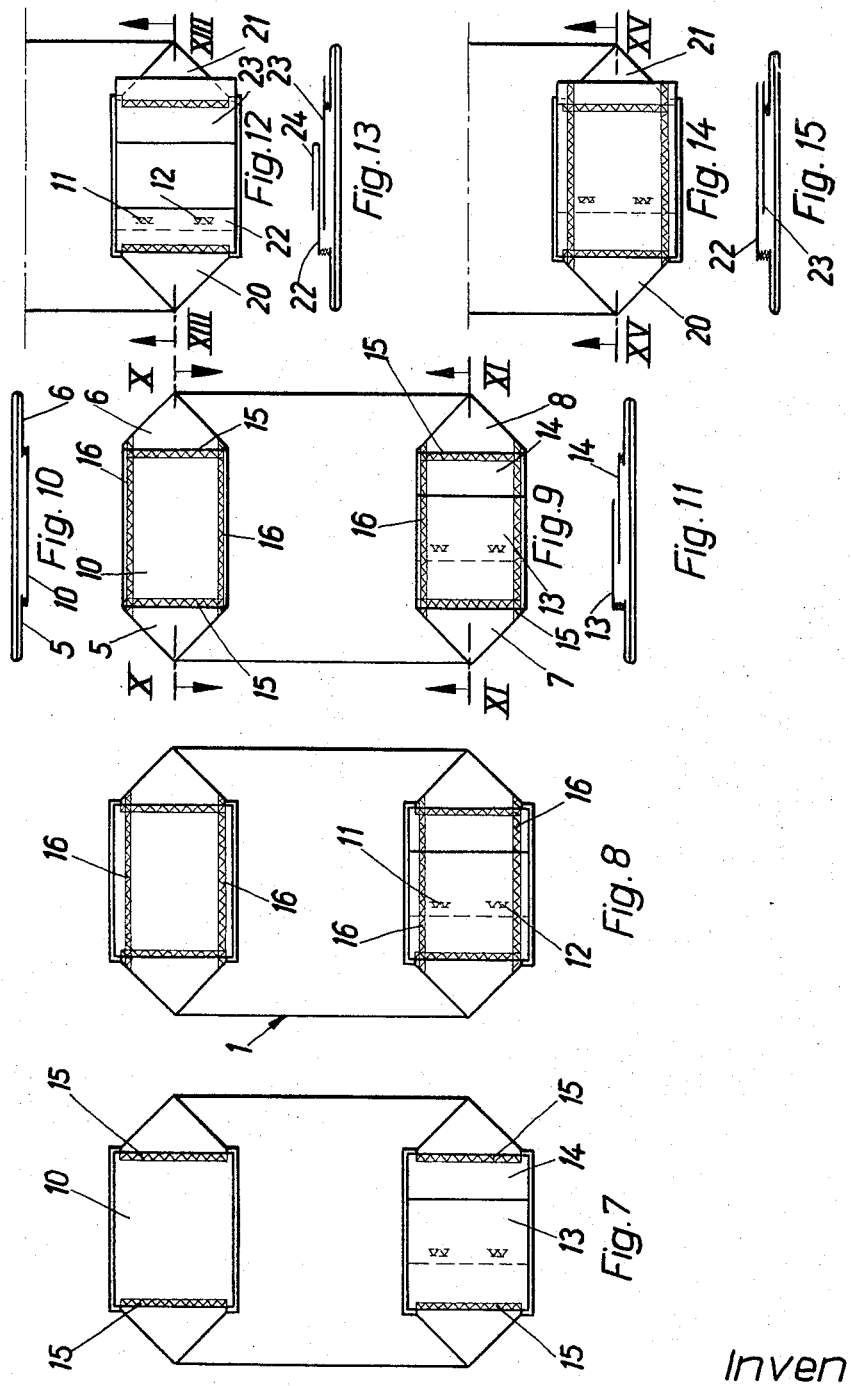

3,369,731
SQUARE-BOTTOM BAG OF WELDABLE
MATERIAL
Friedrich Franz Brockmuller, Lengerich, Westphalia, Germany, assignor to Windmoller & Holscher, Lengerich, Westphalia, Germany, a firm
Original application July 16, 1963, Ser. No. 295,440, now Patent No. 3,272,093, dated Sept. 13, 1966. Divided and this application May 20, 1966, Ser. No. 578,919
Claims priority, application Germany, July 21, 1962, W 32,643
2 Claims. (Cl. 229—62.5)

ABSTRACT OF THE DISCLOSURE

A flat-bottom plastic bag, consisting of a hose section, formed at least at one end by means of corner folds so that a hexagon is formed, and comprising at least one base sheet, secured to the edge of the hose at the bottom by known means, i.e. welding, glueing, etc., in the form of two pairs of sealed seams, which are perpendicular with respect to each other, and one pair of which is parallel to the longitudinal axis of the hose section; the sealed seams of the two pairs of sealed seams crossing each other. This application is a division of application Serial No. 295,440, filed July 16, 1963, now U.S. Patent No. 3,272,-093.

---

The invention relates to a square-bottom bag of a plastic material.

The manufacture of simple and cheap wrappings is essential for the economical use of plastic materials, preferably for throw-away wrappings, and used particularly for materials sensitive to moisture, such as, for example, artificial fertilizers, plastics granulates and cement.

There are already known plastic valve bags, made of a hose section which is welded at both ends and has a filler valve near one end. These bags, known to the trade as cushion bags, have the shape of a cushion when filled and cannot be stored reliably and in a space-saving manner.

The advantage of a good shape in the filled condition is offered by the so-called flat-bottom bags. Such bags made of plastic materials are already known, but, owing to their uneconomical manufacture, they have not been widely adopted. An essential reason is the considerable material expenditure connected with the manufacture of the bottom.

The present invention has therefore the object of providing a flat-bottom bag of plastic material which can be manufactured at minimum material expenditure and by means of machines.

This object is realized by a flat-bottom bag, consisting of a hose section formed at one end by means of corner folds so that a hexagon is formed, and comprising at least one base sheet secured to the edge of the hose at the bottom by known means i.e. welding, glueing, etc.

According to the method for manufacturing the new flat-bottom bag, a section of hose is flattened at the end by means of corner folds and a base sheet is applied to this bottom end, followed by securing this base sheet first to the edge of the corner folds covered thereby, and then to the remaining edge of the hose, also covered by this base sheet.

For manufacturing a valve bag it is necessary also to expand and flatten the other end of the hose section and to secure together two base sheets of equal or different lengths, and offset one relative to the other, and applied to the end where the valve bottom is to be formed, and finally secured to the edge of the hose section.

In a preferred embodiment of this flat-bottom bag, each corner fold has a free end, formed by a cut in the edge of the hose section and connected with the base section by a sealed seam, and the sealed seams connecting the edge portions of the bottom end located perpendicularly to the direction of the hose cross the sealed seams of the corner folds.

The invention will be further described, by way of example, with reference to the accompanying drawings, in which:

FIG. 1 shows a section of hose used according to the invention;

FIGS. 2 to 4 and 7 to 9 show the individual manufacturing stages of a first embodiment of a flat-bottom valve bag;

FIGS. 5 and 6 are cross-sections along the lines V—V and VI—VI in FIG. 4, respectively;

FIGS. 10 and 11 are cross-sections along the lines X—X and XI—XI, respectively, in FIG. 9;

FIG. 12 shows the valve bottom end of a flat-bottom valve bag according to a second embodiment in the stage corresponding to that shown in FIG. 7;

FIG. 13 is a cross-section along the line XIII—XIII in FIG. 12;

FIG. 14 shows the finished valve bottom end; according to the second embodiment of this invention;

FIG. 15 is a cross-section along the line XV—XV in FIG. 14;

The new method of manufacturing a flat-bottom valve bag will now be described with reference to FIGURES 1 to 11.

A plastic hose section 1 is provided at both edges 2, 3 with short cuts 4 in both layers of the flattened hose (FIG. 1). Then the ends of the hose section 1 are opened out (FIG. 2) and flattened down (FIG. 3), forming corner folds 5, 6, 7, 8 which have an extension 9, formed by the recesses or cuts 4. Then a base sheet 10 is applied to the bottom end having the corner folds 5 and 6 (FIGS. 4 and 5), whilst the bottom end with the corner folds 7 and 8 is provided with two bottom sheets 13, 14 of equal length, but offset one to the other, and connected by spot welds or by spot glueing 11, 12 (FIGS. 4 and 6). Next the base sheets 10, 13, 14 are connected with the extensions 9 of the corner folds by welding, glueing, etc. (seams 15 in FIG. 7). Finally, the parts of the edges 2, 3 perpendicular to the direction of the hose are secured to the base sheet 10 or the base sheets 13, 14 (seams 16 in FIG. 8). The arrangement of the sealed seams is here such that the seams 15 cross the seams 16. After cutting off the portions of the longitudinal side edges of the bottom which project over the seams 16, the flat-bottom valve bag is finished (FIG. 9). As may be seen from FIG. 11m the two bottom sheets 13, 14 form a valve. The two spot connections 11, 12 are spaced one from the other, forming a valve duct between them.

FIGURES 12 to 15 show a second embodiment of a valve bottom end of a flat-bottom valve bag.

The open end of a flat-bottom valve bag, having the corner folds 20, 21, is provided with two base sheets 22, 23, but in this embodiment these sheets are of different lengths. Also here, these two sheets are connected by spot connections 11, 12. The lengths of these two sheets are such that the desired offset is obtained at one end, whilst the other ends are flush. In order to secure the lower base sheet 23 to the corner fold 21, the base sheet 22 is applied to the bottom end in a folded condition, forming a rim 24 (FIGS. 12 and 13). In this condition, the base sheets are connected to the corner folds. Then the edge 24 is folded back and the two base sheets 22, 23 are secured to the edge portions of the hose end; normal to the direction of the hose, as in the first embodiment (FIGS. 14 and 15). Also here, the portions of the long bottom edges projecting over the longitudinal bottom seams are finally cut off.

By extending the base sheets 22, 23—to the right in FIG. 15—and the corresponding extension of the longitudinal bottom seams, it is possible to form a protruding valve hose which may be sealed after the filling of the bag.

The long bottom seams, running normal to the direction of the hose, and the cutting off of the protruding portions from the bottom edges may be effected by any suitable, known means, which are not shown and need not be described.

It is of course to be understood that what has been described above is applicable not only to square-bottom welded or glued plastic valve bags, but also to square-bottom bags the individual parts of which are secured to each other by other means other than welding or glueing.

What is claimed is:

1. A flat-bottom plastic bag, which forms a flattened hose section when empty, and has a parallelepidal shape when filled, comprising an end formed by a pair of end flaps respectively integral with and extending from opposite sides of said hose section, said pair of end flaps forming respectively a pair of opposite triangular corner folds, said end having an overall hexagonal shape, at least one base sheet secured to said end by means of a first pair of sealed seams securing said base sheet to said end flaps, said first pair of sealed seams being transverse to the longitudinal axis of said flattened hose section, and by means of a second pair of sealed seams securing said base sheet to said pair of opposite corner folds, said second pair of sealed seams being parallel to said longitudinal axis of said flattened hose section, the seams of said first pair of sealed seams extending over the seams of said second pair of sealed seams and, respectively, ending beyond the seams of said second pair of sealed seams at a point within the short edges of said triangular corner folds.

2. The flat-bottom plastic bag as set forth in claim 1, wherein the opposite end from said end of said hose section is identical to said end except that two base sheets are secured to said opposite end, said two base sheets being secured to each other in an offset arrangement and defining a valve passage therebetween.

References Cited

UNITED STATES PATENTS

| | | | |
|---|---|---|---|
| 3,117,711 | 1/1964 | Camerini | 229—57 |
| 3,195,801 | 7/1965 | Symons et al. | 229—62.5 |

DAVID M. BOCKENEK, *Primary Examiner.*